(12) United States Patent
Miller et al.

(10) Patent No.: US 9,673,738 B2
(45) Date of Patent: Jun. 6, 2017

(54) MULTI-BATTERY PACK FOR POWER TOOLS

(71) Applicant: Techtronic Power Tools Technology Limited, Tortola (VG)

(72) Inventors: Stuart Miller, Anderson, SC (US); James A. Patton, Anderson, SC (US); G. Michael Hornick, Anderson, SC (US); Michael E. Buckner, Central, SC (US); Nicolas J. Hanks, Pendleton, SC (US); Frederick Bryan, Greenville, SC (US)

(73) Assignee: TECHTRONIC POWER TOOLS TECHNOLOGY LIMITED, Tortola (VG)

( * ) Notice: Subject to any disclaimer, the term of this patent is extended or adjusted under 35 U.S.C. 154(b) by 0 days.

(21) Appl. No.: 14/713,902

(22) Filed: May 15, 2015

(65) Prior Publication Data

US 2015/0333666 A1   Nov. 19, 2015

Related U.S. Application Data

(60) Provisional application No. 61/994,471, filed on May 16, 2014.

(51) Int. Cl.
  *H02P 4/00* (2006.01)
  *B25F 5/00* (2006.01)
(52) U.S. Cl.
  CPC . *H02P 4/00* (2013.01); *B25F 5/00* (2013.01)
(58) Field of Classification Search
  CPC ................ B25F 5/02; E21B 1/14; H02P 4/00

USPC ....... 173/2–11, 176–186; 318/479, 459, 500, 318/504; 388/937
See application file for complete search history.

(56) References Cited

U.S. PATENT DOCUMENTS

| | | | |
|---|---|---|---|
| 4,697,134 | A | 9/1987 | Burkum et al. |
| 5,028,858 | A | 7/1991 | Schnizler et al. |
| 5,422,558 | A | 6/1995 | Stewart |
| 5,621,301 | A | 4/1997 | Allen et al. |

(Continued)

FOREIGN PATENT DOCUMENTS

| | | |
|---|---|---|
| EP | 2495843 | 9/2012 |
| JP | 2009095162 | 4/2009 |

(Continued)

OTHER PUBLICATIONS

Mexican Patent Office Action for Application No. MX/a/2015/006198 dated Aug. 31, 2016 (3 pages).

*Primary Examiner* — Bentsu Ro
(74) *Attorney, Agent, or Firm* — Michael Best & Friedrich LLP

(57) ABSTRACT

A power tool including a motor, a first battery pack, a second battery pack, a first switching element coupled between the first battery pack and the motor, a second switching element coupled between the second battery pack and the motor, and controller coupled to the first switching element and the second switching element. The controller includes a first pulse-width modulation (PWM) output coupled to the first switching element and a first PWM signal to selectively close the first switching element. The controller further includes a second PWM output coupled to the second switching element and a second PWM signal to selectively close the second switching element.

21 Claims, 17 Drawing Sheets

(56) References Cited

U.S. PATENT DOCUMENTS

| | | | |
|---|---|---|---|
| 5,652,499 | A | 7/1997 | Morita et al. |
| 5,742,148 | A | 4/1998 | Sudo et al. |
| 5,867,007 | A * | 2/1999 | Kim .................. H02J 7/0024 320/118 |
| 6,049,141 | A | 4/2000 | Sieminski et al. |
| 6,064,178 | A | 5/2000 | Miller |
| 6,075,341 | A | 6/2000 | White et al. |
| 6,127,801 | A | 10/2000 | Manor |
| 6,133,711 | A | 10/2000 | Hayashi et al. |
| 6,157,165 | A | 12/2000 | Kinoshita et al. |
| 6,177,779 | B1 | 1/2001 | Eguchi |
| 6,271,605 | B1 | 8/2001 | Carkner et al. |
| 6,313,611 | B1 * | 11/2001 | Mowry ............ G01R 19/16542 320/132 |
| 6,346,795 | B2 | 2/2002 | Haraguchi et al. |
| 6,373,226 | B1 | 4/2002 | Itou et al. |
| 6,387,553 | B1 | 5/2002 | Putt et al. |
| 6,577,104 | B2 | 6/2003 | Sakakibara |
| 6,605,923 | B1 | 8/2003 | Kellogg |
| 6,771,043 | B2 | 8/2004 | Matsunaga et al. |
| 6,850,041 | B2 | 2/2005 | Takano |
| 6,977,482 | B2 | 12/2005 | Popescu-Stanesti et al. |
| 7,036,605 | B2 | 5/2006 | Suzuki et al. |
| 7,109,675 | B2 | 9/2006 | Matsunaga et al. |
| 7,160,132 | B2 | 1/2007 | Phillips et al. |
| 7,161,326 | B2 | 1/2007 | Kubota et al. |
| 7,183,014 | B2 | 2/2007 | Sasaki et al. |
| 7,282,891 | B2 | 10/2007 | Smallwood et al. |
| 7,339,350 | B2 | 3/2008 | Kubale et al. |
| 7,564,217 | B2 | 7/2009 | Tanigawa et al. |
| 7,570,017 | B2 | 8/2009 | Sainomoto et al. |
| 7,621,652 | B2 | 11/2009 | Zick |
| 7,656,131 | B2 | 2/2010 | Embrey et al. |
| 7,659,699 | B2 | 2/2010 | Boebel |
| 7,667,342 | B2 | 2/2010 | Matsumoto et al. |
| 7,701,172 | B2 | 4/2010 | Watson et al. |
| 7,734,317 | B2 | 6/2010 | Patel et al. |
| 7,838,142 | B2 | 11/2010 | Scheucher |
| 7,989,985 | B2 | 8/2011 | Patel |
| 8,025,118 | B2 | 9/2011 | Scheucher |
| 8,154,248 | B2 | 4/2012 | Cruise et al. |
| 8,198,835 | B2 * | 6/2012 | Yokoyama ................ B25F 5/00 318/139 |
| 8,210,273 | B2 | 7/2012 | Suzuki et al. |
| 8,253,378 | B2 | 8/2012 | Lee et al. |
| 8,310,177 | B2 | 11/2012 | Naumann et al. |
| 8,381,829 | B2 | 2/2013 | Hanawa et al. |
| 8,490,732 | B2 | 7/2013 | Sugimoto et al. |
| 8,547,066 | B2 | 10/2013 | Bieler et al. |
| 8,579,042 | B2 | 11/2013 | Hanawa et al. |
| 8,733,470 | B2 * | 5/2014 | Matthias ................ B25F 5/02 173/170 |
| 8,796,992 | B2 | 8/2014 | Wu |
| 8,803,483 | B2 | 8/2014 | Nagase |
| 8,813,866 | B2 | 8/2014 | Suzuki |
| 2002/0101218 | A1 | 8/2002 | Koenck et al. |
| 2003/0096158 | A1 | 5/2003 | Takano et al. |
| 2005/0112416 | A1 | 5/2005 | Sakakibara |
| 2005/0287880 | A1 | 12/2005 | Okuyama |
| 2006/0104836 | A1 | 5/2006 | Phillips |
| 2006/0244414 | A1 | 11/2006 | Lay |
| 2008/0213668 | A1 | 9/2008 | Muraoka et al. |
| 2010/0085008 | A1 | 4/2010 | Suzuki et al. |
| 2010/0102882 | A1 | 4/2010 | Yoshino et al. |
| 2010/0270973 | A1 | 10/2010 | Miyazaki et al. |
| 2011/0056177 | A1 | 3/2011 | Goto |
| 2011/0101909 | A1 | 5/2011 | Bowman |
| 2011/0169455 | A1 | 7/2011 | Nagase |
| 2011/0197389 | A1 | 8/2011 | Ota et al. |
| 2011/0198103 | A1 | 8/2011 | Suzuki |
| 2011/0279090 | A1 | 11/2011 | Bauer |
| 2011/0291617 | A1 | 12/2011 | Rosenbecker et al. |
| 2011/0298626 | A1 | 12/2011 | Fechalos et al. |
| 2012/0037385 | A1 | 2/2012 | Suzuki et al. |
| 2012/0048587 | A1 | 3/2012 | Umemura et al. |
| 2012/0133205 | A1 | 5/2012 | Adams et al. |
| 2012/0139548 | A1 | 6/2012 | Yang et al. |
| 2012/0161714 | A1 | 6/2012 | Ishibashi |
| 2012/0182021 | A1 | 7/2012 | Mccoy et al. |
| 2012/0205984 | A1 | 8/2012 | Goto et al. |
| 2012/0227994 | A1 | 9/2012 | Yang et al. |
| 2012/0268057 | A1 | 10/2012 | Wu |
| 2012/0293112 | A1 | 11/2012 | Suzuki |
| 2012/0319652 | A1 | 12/2012 | Namou et al. |
| 2012/0321912 | A1 | 12/2012 | Hachisuka et al. |
| 2013/0025893 | A1 | 1/2013 | Ota et al. |
| 2013/0162045 | A1 | 6/2013 | Weissenborn et al. |
| 2013/0164589 | A1 | 6/2013 | Ota et al. |
| 2013/0187461 | A1 | 7/2013 | Goto et al. |
| 2014/0009857 | A1 | 1/2014 | Suzuki |
| 2014/0203780 | A1 | 7/2014 | Hu et al. |
| 2014/0265604 | A1 | 9/2014 | Mergener |

FOREIGN PATENT DOCUMENTS

| | | |
|---|---|---|
| WO | 2010/109881 | 9/2010 |
| WO | 2011/099348 | 8/2011 |
| WO | 2011/099349 | 8/2011 |
| WO | 2012/039418 | 3/2012 |
| WO | 2012/059470 | 5/2012 |
| WO | 2013/138955 | 9/2013 |
| WO | 2014/119135 | 8/2014 |
| WO | 2014/119188 | 8/2014 |
| WO | 2014/119192 | 8/2014 |
| WO | 2014/119203 | 8/2014 |
| WO | 2014/119210 | 8/2014 |
| WO | 2014/119216 | 8/2014 |
| WO | 2014/119732 | 8/2014 |
| WO | 2014/119733 | 8/2014 |
| WO | 2014/119757 | 8/2014 |

* cited by examiner

MULTI-BATTERY PACK FOR POWER TOOLS

CROSS-REFERENCE TO RELATED APPLICATIONS

This application claims priority to U.S. Provisional Application No. 61/994,471, filed on May 16, 2014, the entire contents of which are incorporated herein by reference.

FIELD OF THE INVENTION

The present invention relates to the multi-battery pack configurations for power tools, such as miter saws, drill/drivers, canister vacuums, lawn mowers, string trimmers, hedge-trimmers, and leaf-blowers.

BACKGROUND

Traditionally, lawn and garden power tools are powered by a gasoline engine, 120-volt alternating current (AC) power source, or a direct current (DC) battery power source. Woodworking, metalworking, and construction power tools are also powered by a gasoline engine, 120-volt (V) AC power source, or a DC battery power source.

Connecting multiple battery packs together can increase the capacity of the battery system. For example, connecting multiple battery packs in parallel generally increases the capacity (ampere-hours) of the battery system, while the combined output (e.g., 18V) retains the voltage of the individual battery packs (e.g., 18V). However, if the voltages of the battery packs, connected in parallel are not approximately equal, issues can arise. The term battery pack and battery as used herein may be used interchangeably to refer to a battery pack.

One such issue for parallel-connected battery packs is cross-charging. Cross-charging can occur if one battery pack is at a reasonably higher voltage, or state of charge, than the voltage of another parallel-connected battery pack. If this occurs, current from the battery pack at the higher voltage will flow into the battery pack at the lower voltage. This current can become relatively large (e.g., 25 ampere (A)) and, therefore, can be hazardous to the battery packs, especially in certain operating conditions (e.g., at low temperature). Cross-charging can also occur when the battery packs connected in parallel have unequal capacity size.

Another issue for parallel-connected battery packs may arise if one of the battery packs connected in parallel becomes fully discharged before the other battery pack. If this occurs, the battery pack that is fully discharged, but still connected, can be permanently damaged.

Another issue for parallel connected battery packs may arise if one of the battery packs connected in parallel becomes over-heated. If this occurs, the battery pack which is over-heated, but still connected, can be permanently damaged.

Series connected battery packs may also have similar issues, as described in more detail below.

Embodiments of the invention are operable to overcome such issues, as well as other issues related to a power tool operable to receive and be powered by multiple battery packs.

SUMMARY

In one embodiment, the invention provides a power tool including a motor, a first battery pack, a second battery pack, a first switching element coupled between the first battery pack and the motor, a second switching element coupled between the second battery pack and the motor, and controller coupled to the first switching element and the second switching element. The controller includes a first pulse-width modulation (PWM) output coupled to the first switching element and a first PWM signal to selectively close the first switching element. The controller further includes a second PWM output coupled to the second switching element and a second PWM signal to selectively close the second switching element.

In another embodiment, the invention provides a method of operating a power tool having a motor, a first battery pack, a second battery pack, a first switching element coupled between the first battery pack and the motor, a second switching element coupled between the second battery pack and the motor, and a controller. The method includes determining, by the controller, a state of charge of the first battery and a state of charge of the second battery. The method further includes generating, by the controller, a first pulse-width modulation (PWM) signal to selectively close the first switching element to present power from the first battery pack to the motor, the first PWM signal based on the state of charge of the first battery; and generating, by the controller, a second PWM signal to selectively close the second switching element to present power from the second battery pack to the motor, the second PWM signal based on the state of charge of the second battery. The method further includes driving the motor by the first battery pack and the second battery pack asynchronously.

Independent aspects and other aspects of the invention will become apparent by consideration of the detailed description and accompanying drawings.

DETAILED DESCRIPTION

Figure 1:
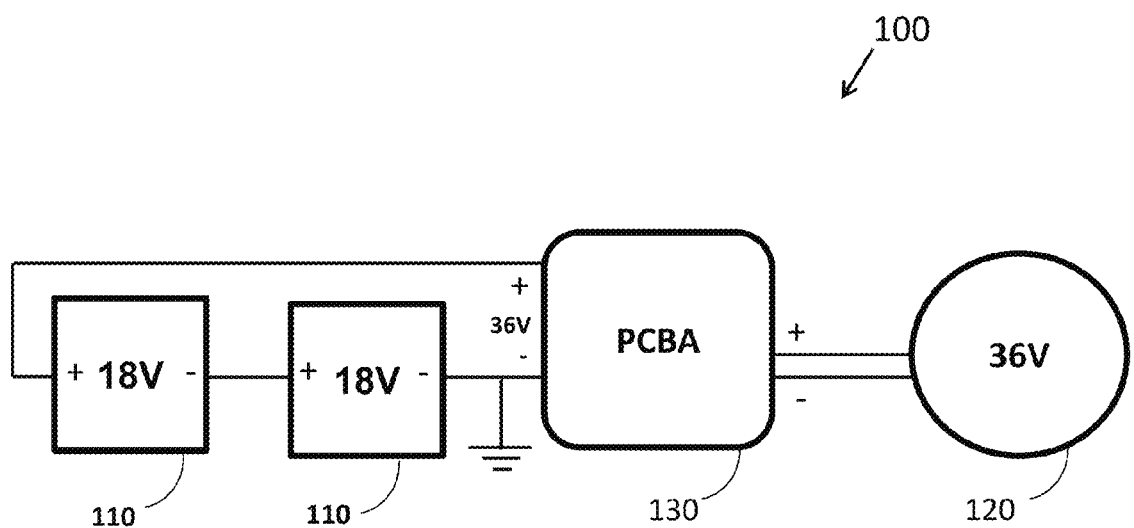
FIG. 1 illustrates a block diagram of a series-connected multiple battery pack configuration according to a first embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

It should be noted that a plurality of hardware and software based devices, as well as a plurality of different structural components may be utilized to implement aspects of the invention. Furthermore, specific configurations described or illustrated in the drawings are intended to exemplify independent embodiments of the invention and that other alternative configurations are possible. The terms "controller", "processor", "central processing unit" and "CPU" are interchangeable unless otherwise stated. Where the terms "controller", "processor", "central processing unit" or "CPU" are used as identifying a unit performing specific functions, it should be understood that, unless otherwise stated, those functions can be carried out by a single processor or multiple processors arranged in any form, including parallel processors, serial processors, tandem processors or cloud processing/cloud computing configurations.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Furthermore, throughout the specification, if capitalized terms are used, such terms are used to conform to common practices and to help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Battery packs can be used to power the motors on power tools, such as miter saws, canister vacuums, and lawn mowers. On motor startup, the torque in the powertrain and the electrical current can surge, which can damage the battery packs and/or other components of the power tool or can create additional wear on the battery packs and/or power tool thus shortening the life of the battery packs and/or power tool.

A soft start mechanism, such as a motor soft starter, can be used with electric motors to temporarily reduce the load and torque in the powertrain and electrical current surge of the motor during startup. The soft start mechanism reduces the mechanical stress on the motor and shaft, as well as the electrodynamic stresses on the attached power cables and electrical distribution network, extending the lifespan of the system.

The soft start mechanism can consist of mechanical or electrical devices, or a combination of both. For example, mechanical soft starters can include clutches and several types of couplings using a fluid, magnetic forces, or steel shot to transmit torque, similar to other forms of torque limiter. Electrical soft starters can be any control system that reduces the torque by temporarily reducing the voltage or current input, or a device that temporarily alters how the motor is connected in the electric circuit. For instance, electrical soft starters can use solid state devices to control the current flow and therefore the voltage applied to the motor. The electrical soft starters can be connected in series with the line voltage applied to the motor. Each of the various embodiments described may also include a soft start mechanism for the motor. Each of the motors described may include a brushed or brushless DC motor.

Battery packs may be configured to have various DC voltage levels (e.g., 12 volts, 18 volts, 24 volts, or 28 volts). In the illustrated embodiments, the battery packs are 18 volt battery packs. In other embodiments, the capacity of the battery packs may be different. For example, the battery packs can be 12 volt battery packs, 28 volt battery packs, 40 volt battery packs, or another voltage. In an example, the battery packs can include one or more lithium-ion (Li-ion) cells arranged to output direct current at about 18 volts. Other battery-packs, battery-pack arrangements, or voltages (e.g., 12 volts, 24 volts, or 28 volts) can be employed to power the power tool if desired.

In one construction, the battery cells in the battery packs are rechargeable lithium-ion cells. In other constructions, the battery cells may have a chemistry other than lithium-ion such as, for example, nickel cadmium (NiCa or NiCad), nickel metal-hydride, and the like. Additionally or alternatively, the battery cells may be non-rechargeable cells. In one embodiment, the batteries are power tool battery packs including a pack housing containing one or more battery cells and latching mechanisms for selectively securing the battery packs to the battery interfaces. Such a power tool battery pack is described and illustrated in U.S. Pat. No. 7,714,538, issued May 11, 2010, the entire contents of which is hereby incorporated by reference.

FIG. 1 is a block diagram of a series-connected, multiple battery pack configuration 100. When the two 18 volt battery packs 110 are connected in series, the total voltage across the motor terminals of the motor 120 is at about 36V. The motor current is similar in both packs. The series configuration 100 is relatively efficient technique to power a higher voltage motor (e.g., 36V) because no voltage conversion loss occurs to up-convert the voltage (e.g., from 18V to 36V). Additional protection circuitry may be used to prevent battery pack damage as one battery pack shuts down. For example, when the voltage or current drops due to depletion (or charge exhaustion) in one or both of the two battery packs 110, the protection circuitry can disconnect the battery packs 100 from the motor 120. Circuitry can also be used to prevent damage to depleted battery packs 110, such as NiCd battery packs when depleted. A printed circuit board (PCB) assembly 130 can be used for multiple battery pack functionality and circuitry, such as motor brake functions, battery pack protection, and the soft start mechanism. The PCB mechanically supports and electrically connects electronic components using conductive tracks, pads and other features etched from metal (e.g., copper) sheets laminated onto a non-conductive (e.g., insulator) substrate. The PCB assembly (PCBA) may include a controller or state machine.

Figure 2:
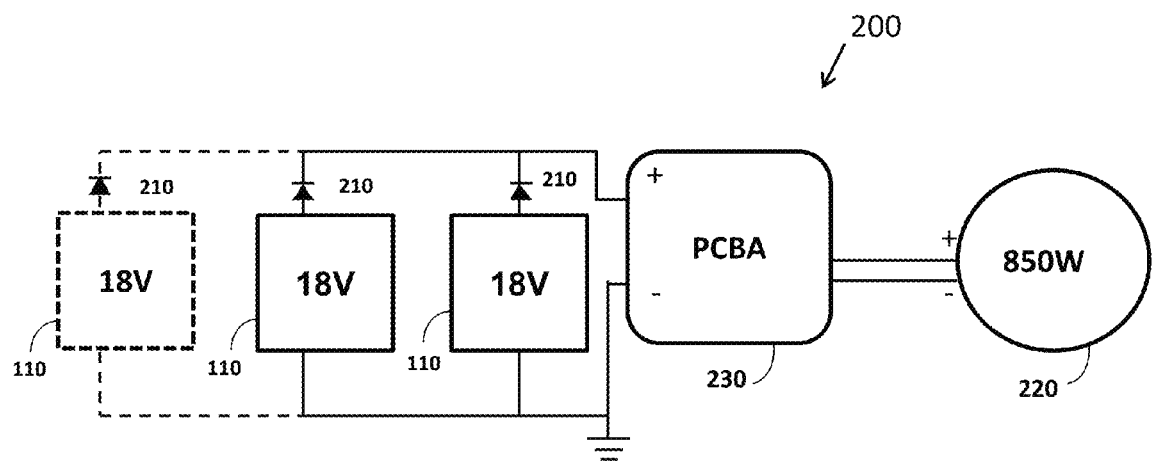
FIG. 2 illustrates a block diagram of a parallel-connected multiple battery pack configuration according to a second embodiment of the invention.

In the series configuration 100, the performance of the power tool (or motor) can be limited by the highest impedance battery pack (e.g., weakest battery pack), which can vary the motor performance. Once the lowest capacity battery pack 110 is depleted (i.e., consumed or discharged), the power tool shuts down. For instance, the protection circuitry will disconnect one or both of the battery packs once either one is depleted FIG. 2 illustrates a block diagram of another multi-battery pack configuration, a parallel-connected multiple battery pack configuration 200 (parallel configuration 200). The parallel configuration 200 includes multiple battery packs 110 for a power tool connected in a parallel configuration and having speed control. In the parallel configuration 200, the battery packs 110 are discharged in parallel and simultaneously when the battery packs 110 are at the same state of discharge (or equilibrium).

Battery packs 110 connected in such a parallel configuration 200 should be at the same state of discharge for simultaneous discharge. If battery packs 110 at different states of discharge are installed into a device (e.g., power tool) using a parallel battery configuration 200, the battery pack 110 with the higher voltage charges the battery pack 110 with lower voltage (i.e., cross-charges) until voltage equilibrium is reached in the system. The cross-charging of lower voltage battery packs 110 by the higher voltage battery packs 110 can lead to leakage, elevated temperature, or other damage to the lower voltage battery pack 110. In some instances, the parallel configuration 200 includes one or more diodes 210 connected between battery packs 110 to prevent cross-charging by preventing current flow into the battery packs 110. Accordingly, a PCBA 230 is operable to control the battery packs 110 such that, when the battery packs 110 are unbalanced, the higher voltage battery pack(s) 110 is/are relied on for powering the tool, and the lower voltage battery pack(s) is/are disconnected. The higher voltage battery pack(s) 110 are used until their state of charge drops and equilibrium is reached between the battery packs 110. Once equilibrium is achieved, the battery packs 110 can again be connected in parallel to simultaneously provide power to the motor 220.

In the parallel configuration 200, the motor 220 may operate at a lower voltage, such as 16V or 18V, with a higher current and greater power (more wattage). For example, the parallel-connected battery packs 110 may be configured to operate a motor 220 at about 850 watts (W). Operating at a lower voltage allows a consistent performance of the motor 220 through discharge curve of the battery packs 110. The motor 220 is configured to operate as a 4 pole motor, which can be more efficient than a 2 pole motor. Thus, the motor 220 is configured to operate as a 4 brush motor, so a lower current density exists in each of the brushes. The parallel configuration 200 includes a PCBA 230, which uses pulse-width modulation (PWM) speed control and/or bypass capacitors to maintain the speed of the motor 220 regardless of load on the power tool, which can provide consistent performance of the motor 220. PWM is a modulation technique that conforms the width of the pulse based on modulator signal information. The PWM modulation technique can be used to allow the control of the power supplied to electrical devices (e.g., power tools), especially to inertial loads such as motors. PWM can also allow a temporary boost in power. Temporary boost is possible via bypass and/or an increased PWM duty cycle for a short duration. With PWM and/or bypass, the motor can smoothly transition from no load to high load scenarios. The bypass capacitors can be used to handle the high inductance of the motor.

Due to the relatively low voltage and high current of the parallel configuration 200, high power field-effect transistors (FETs) or high current FETs may be used to handle the higher currents. The power FETs or high current FETs can include metal-oxide-semiconductor field-effect transistors (MOSFETs). To mitigate the negative effects of cross charging, a diode can be placed in the circuitry between the battery packs 110 to prevent a voltage drop between the battery packs 110. Because the motor 220 operates off of a lower voltage that can be provided by a single battery pack 110 (e.g., 16V or 18V), the product (e.g., power tool) can run on any number of battery packs 110 (e.g., one, two, or more battery packs). Because each battery 110 is brought on-line when the discharge state of that battery 110 matches the discharge state of the operating batteries 110 in the system (e.g., power tool), full capacity is delivered by each battery pack 110. The parallel configuration 200 allows battery packs 110 of varying ages and discharge state to be used. Older battery packs 110 can hold less charge and, thus, would contribute proportionally less. A PCBA 230 can include high current FETs and the soft start mechanism and can be used for multiple battery pack functionality and circuitry, such as maintaining a constant speed, monitoring back electrical motive force (EMF) (in volts), and providing a power boost. The PCBA 230 can detect back EMF and determine motor speed and control the motor 220 according to the sensed back EMF. Sensed back EMF can be used to determine when to modify a PWM and/or use bypass capacitors.

Figure 3:
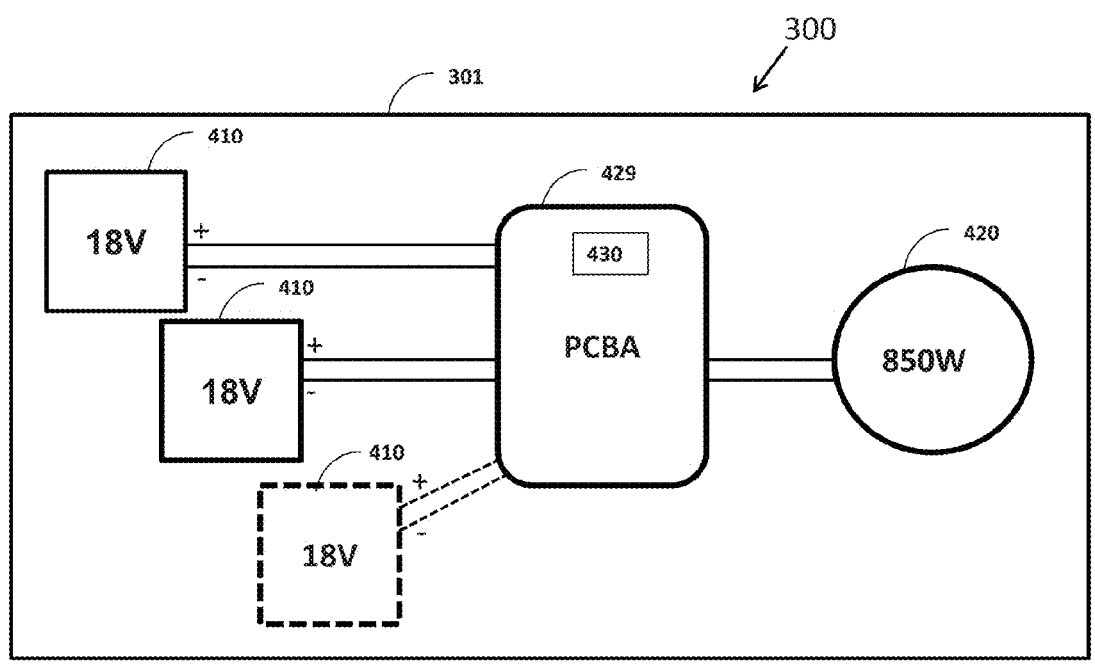
FIG. 3 illustrates a block diagram of a sequenced, parallel-connected multiple battery pack configuration according to a third embodiment of the invention.

FIG. 3 illustrates a block diagram of a sequenced, parallel-connected multiple battery pack configuration 300 (parallel-sequenced configuration 300) for a power tool 301. The power tool 301 may be a miter saw, drill/driver, canister vacuum, lawn mower, string trimmer, hedge-trimmer, leaf-blower, or another tool. The parallel-sequenced configuration 300 includes multiple battery packs 410a, b, and c, although some instances of the configuration 300 have two battery packs (i.e., 410a and 410b) and other instances have more than three battery packs 410. The configuration 300 includes a motor 420, such as a brushless DC motor or a brushed motor, and a PCBA 429 with a controller 430 having a memory with program instructions and data and a processor executing the program instructions and utilizing the data to implement the various components of the controller 430 described herein. The batteries 410 are connected to the motor 420 via a battery selector 440 that is selectively controlled by the controller 430 to, in some instances, connect one of the batteries 410 to the motor 420 at a time.

The controller 430 includes a battery monitor 442 and current monitor 444 to monitor characteristic of the batteries 410, and an indicator control 445 to indicate a determined battery characteristic. More specifically, the battery monitor 442 is coupled to voltage sensors 446 to measure the state of charge of each battery pack 410, and the current monitor 444 is coupled to current sensors 448 to detect the current output by each battery pack 410. Direct current internal resistance (DCIR) of each battery pack 410 can be calculated to determine a state of charge of the battery. DCIR is the impedance or internal resistance of a power source (e.g., the battery pack 410) in a loaded condition (e.g., providing current to the motor 420). DCIR is calculated and used to indicate charge remaining in the battery pack 410 when the battery pack 410 is under load or producing current. The indicator control 445 controls light emitting diodes (LEDs) 449 to indicate the state of charge of each battery pack 410. For instance, the LEDs 449 may include several LEDs (e.g., 4) associated with each battery pack 410 and the higher the state of charge of an associated battery pack 410, the more LEDs are illuminated. In some instances, the LEDs 449 are disabled while the power tool, such as a saw, is in operation. As an example operation flow, after each trigger pull of the power tool (e.g., a saw) having the controller 430, the battery monitor 442 determines and conveys to the indicator control 445 the state of charge of each battery pack 410, and the indicator control 445 controls the LEDs 449 to indicate the state of charge of each battery pack 410. In other instances, the LEDs 449 are used to indicate the state of charge of the battery packs 410 while the power tool, such as a lawn mower, is in operation.

In some embodiments, the LEDs 449 indicate the power being output by each battery pack 410. For instance, the indicator control 445 receives the current measurement and the voltage measurement for each battery pack 410, from the current monitor 444 and battery monitor 442, respectively. The indicator control 445 then calculates the power output (e.g., in watts) by each battery pack 410 by taking the product of the current and voltage of the battery pack 410. The LEDs 449 are then controlled by the indicator control 445 to indicate to a user the power output by each battery pack 410. The LEDs 449 may include several LEDs associated with each battery pack 410, where the LEDs 449 are controlled by the indicator control 445 such that, the higher the power output by one of the battery packs 410, the more LEDs that are enabled for that battery pack 410. The controller 430 further includes a short circuit protection control 464 that controls a short circuit protection switch 466. When excessive current is detected (e.g., by the current monitor 444), the short circuit protection control 464 controls the short circuit protection switch 466 to open and stop the flow of current from the battery packs 410 through the motor 420. In some embodiments, the short circuit protection switch 466 can be used for PWM control of the motor 420, for instance, as an alternative to using the battery selector switches 440.

In some embodiments, the half bridge circuit 462 may be used for half bridge motor control in conjunction with the brake switch 460 acting as a low side switch. In some embodiments, the battery selector switch 440 acts as a high side switch while the h-bridge circuit 462 acts as a low side switch for bridge motor control.

In contrast to the parallel configuration 200, where parallel battery packs 110 are discharged simultaneously, the parallel-sequenced configuration 300 uses one battery pack 410 at a time to power the motor 420 and cycles between battery packs 410 as the source of power by controlling the battery selector 440. The parallel-sequenced configuration 300 selectively connects one of the multiple batteries 410, arranged in parallel, to increase the total energy available to the device and/or power tool.

In some embodiments, through control of the battery selector 440 to only select one battery 410 at a time, one or more diodes for preventing cross-charging are not necessary. Accordingly, the efficiency of the configuration 300 relative to the configuration 200 is increased as the voltage drop across the diodes is not present in such systems. However, in some cases, multiple FETs 452 will be closed at the same time (e.g., momentarily during an overlap period) whether intentionally or unintentionally. In these instances, the configuration 300 may include additional circuitry to prevent cross charging and other conditions that can damage the battery packs 410.

More particularly, in some embodiments, the configuration 300 includes reverse current blocking elements 470, one associated with each battery pack 410. Reverse current blocking elements 470 can include, for example, a diode allowing current to flow from each battery 410 to the battery selector 440, but not allowing current to flow back into the batteries 410. Alternatively, to improve the efficiency by reducing the voltage drop across the reverse current blocking element 470, the reverse current blocking elements 470 are a FET having a drain and a gate coupled to the battery 410 and a source connected downstream on the side of the battery selector 440. This type of FET connection may also be referred to as an "upside down" FET. The diode and upside down FET can be considered passive reverse current blocking elements 470.

In some embodiments, the configuration includes active reverse current blocking elements 470, such as FETs (one per battery 410) controlled by the blocking control 472 of the controller 430. The blocking control 472 is configured to send a reverse current blocking control output to the reverse current blocking elements 470. Here, the FETs 470 of the battery packs 410 not being relied upon to power the motor 420 are opened to prevent back flow of current into those battery packs 410, while the FET 470 associated with the battery pack 410 that is being relied upon to power the motor 420 is closed to allow current to flow out of the battery pack 410 to the motor 420. Using FETs as reverse current blocking elements 470, rather than diodes, provides an increase in efficiency for the system as FETs typically have less of a voltage drop than diodes.

As illustrated, the motor 420 is an approximately 850W motor, although motors of different wattages are included in other embodiments. Additionally, the motor 420 is a brushed DC motor 420 in the illustrated embodiments. However, in some embodiments, the motor 420 is a brushless DC motor.

The controller 430 is further used to maintain a constant speed of the motor 420, provide a soft start, and provide a power boost (extra current through the motor 420), through the signaling of the PWM battery FET control 450 to the battery selector 440.

As noted, each battery pack 410 is associated with a FET 452 that is controlled by a PWM signal output by the PWM battery FET control 450. Generally speaking, when a FET 452 is closed (or "on"), the FET 452 is in a conducting state such that current can flow through to the motor 420; and when the FET 452 is open (or "off"), the FET is in a non-conducting state such that no current can flow through.

The PWM battery FET control 450 determines the duty cycle of each PWM signal based on characteristics of the associated battery pack 410 determined by the controller 430. For example, in some embodiments, the larger the state of charge of a particular battery pack 410, the higher the percentage duty cycle for the PWM signal for its associated FET 452. Accordingly, as the controller 430 cycles through the battery packs 410 to power the motor 420, the battery packs 410 with a higher state of charge will be enabled longer and discharge more current than the battery packs 410 with a lower state of charge. With this approach, the battery packs 410 will discharge at different rates overtime, and can be controlled to become completely discharged at approximately the same time, even though the battery packs 410 started out with different capacities or states of charge. In some instances, cycling between the batteries 410 allows the controller 430 to maximize the delivered energy.

Figure 5:
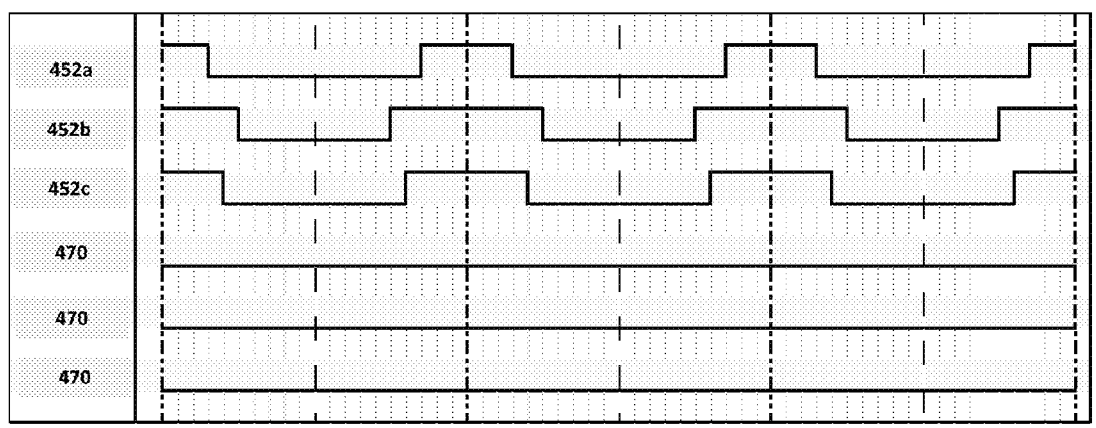
FIGS. 5-7 illustrate a timing diagrams for a parallel-connected multiple battery pack configuration according to the third embodiment of the invention.
Figure 6:
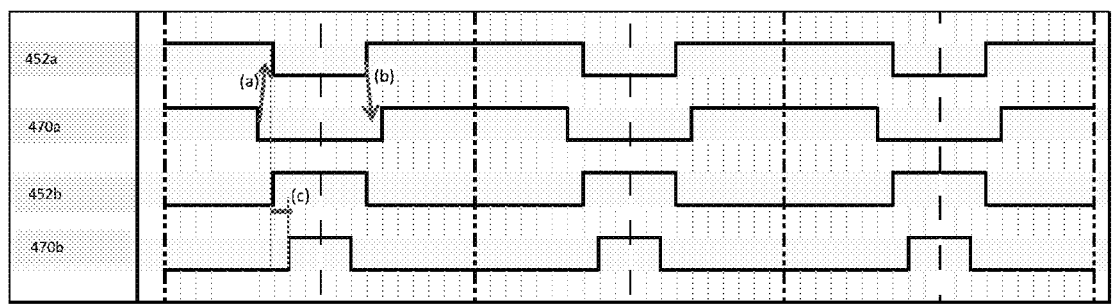
Figure 7:
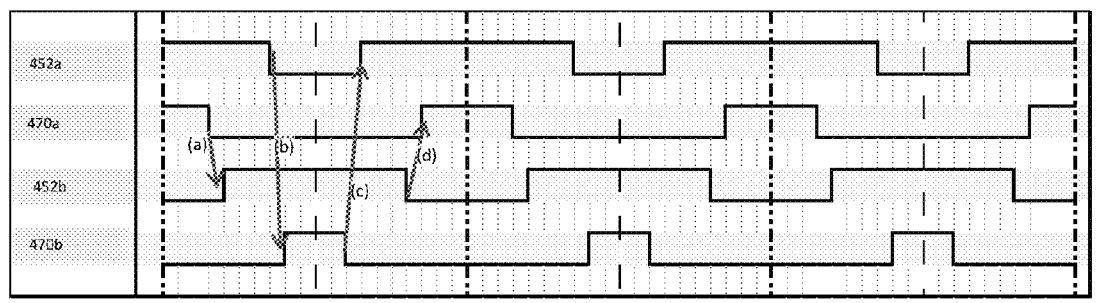

FIGS. 5-7 illustrate timing diagrams of the reverse current blocking elements 470 and the FETs 452 of the configuration 300. More particularly, FIG. 5 illustrates FETs 452 with passive reverse current blocking elements 470 (e.g., diodes or upside down FETs). Accordingly, as shown, the passive reverse current blocking elements 470 in FIG. 7 are not controlled (e.g., the signal remains low). In FIG. 5, the FETs 452*a-c* each reactive a PWM signal form the PWM battery FET control 450 having a different duty cycle, which is proportional to the state of charge of the associated battery pack 410. For instance, FET 452*b* has the largest duty cycle, FET 452*c* having the second largest duty cycle, and FET 452*a* having the smallest duty cycle. Accordingly, from highest to lowest, the state of charge of the battery packs 410 goes battery 410*b*, 410*c*, and 410*a*. Although multiple FETs 452 are enabled or "on" at the same time, the reverse current blocking elements 470 prevent backflow of current to battery packs 410. Relative to the timing diagram of FIG. 5, in some embodiments, the "on" period of each FET 452 has significantly less or no overlap with the other FETs 452.

FIG. 6 illustrates FETs 452 with active reverse current blocking elements 470. More particularly, the reverse current blocking elements 470 are FETs, each controlled by a separate PWM signal from the blocking control 472. In this example, the first switching element 452*a* is open when the second switching element 452*b* is closed, and the first switching element 452*a* is closed when the second switching element 452*b* is open. The switching elements 452 are never both closed at the same time. This means that an "on period" of the first PWM signal, corresponding to the first switching element 452*a*, does not overlap with an "on period" of the second PWM signal, corresponding to the second switching element 452*a*. The first and second PWM signals control the first and second switching elements 452*a* and 452*b* such that the first and second batteries 410*a* and 410*b* follow a cyclical pattern of turning on and off.

The duty cycle of PWM signal for the first switching element 452*a* is larger than the duty cycle of PWM signal for the second switching element 452*b*. As noted above, the duty cycle may be proportional to a battery pack 410 characteristic, such as its state of charge. In this instance, the battery pack 410*a* has a greater state of charger than that of the battery pack 410*b*. Thus, over the illustrated block of time, the first battery 410*a* will power the motor 420 for longer periods of time than the second battery 410*b* and will discharge at a higher rate.

Also in FIG. 6, the PWM signals for the reverse current blocking elements 470 follow essentially the same pattern as the PWM signals for their corresponding FETs 452, but have a slightly lower PWM duty cycle. For example, as illustrated, the reverse current blocking element 470*a* turns off before the FET 452*a* turns off (label a), and turns on after the FET 452 turns on (label b). This difference between the FET 452 and reverse current blocking element 470 activation/deactivation is a time delay "c."

FIG. 7 also illustrates FETs 452 with active reverse current blocking elements 470. In this example, the first switching element 452*a* and the second switching element 452*b* have overlapping periods of being "on." However, whenever both FETs 452*a* and 452*b* are "on," the revere current blocking elements 470 are both "off," preventing back flow of current to the battery packs 410*a* and 410*b*. Accordingly, again, the controller 430 cyclically connects the battery packs 410 to the motor 420, but only one of the battery packs 410 are powering the motor 420 at a given moment in time. Also in FIG. 7, the PWM signals for the reverse current blocking elements 470 again follow a similar pattern as the PWM signals for their corresponding FETs 452, but have a much lower PWM duty cycle than the example of FIG. 7.

The various non-mechanical switches (e.g. FETs 452, brake switch 460, and protection switch 466) can include a transistor, an array of transistors, power MOSFETs (also referred to as FETs), or Darlington arrays.

The current sensors 448 can include a current sense resistor in series with one battery pack 410. The current sensors 448 can include an amplifier (e.g., LMV321AS5X in FIG. 12) to amplify the voltage across the current sense resistor. The amplified signal is then received by the current monitor 44, which interprets the signal to determine the current being drawn by the motor 420. In some embodiments, the parallel-sequenced configuration 300 includes a single current sensor 448 in series with the motor and downstream of the battery selector 440, so that the current sensor 448 provides an indication of the current of the motor 420 regardless of the battery pack 410 selected. Including a current sense 448 for each battery pack 410 enables independent battery current monitoring and more precise control. A mechanical start/stop switch, such as a trigger (not shown), is actuated by the user to control driving the motor 420. The trigger may provide an input to the controller 430, and the controller 430 can produce control signals to drive the motor 420 in response. The input may be binary (i.e., on or off) or a position sensor may be included to provide a variable signal for more precise motor control. In some instances, the tool includes a mechanical boost switch (not shown) that outputs a signal to the controller 430 indicative of the user's desire to enter a boost mode or a normal mode. In the boost mode, the PWM battery FET control (and possibly the blocking control 472) output increased duty cycle PWM signals to provide more current to the motor 420.

In operation, the controller 430 runs each battery pack 410 in the parallel configuration sequentially, for instance, until the battery pack 410 is exhausted, and then switches to use the next battery pack 410 in the system. Alternatively, the parallel-sequenced configuration 300 can sequentially cycle through each battery pack 410 for only a short period of time, and can repeat this cyclical pattern until each battery pack 410 is exhausted.

For example, the motor can be powered the battery pack 410*a* for 10 seconds, then the battery pack 410*b* for 10 seconds, the battery pack 410*c* for 10 seconds, then back to the battery pack 410*a* for 10 seconds, and so on. When a battery pack 410 is depleted, the cycle will continue with one less battery pack 410. This cyclical pattern will repeat until all of the battery packs 410 are depleted. The period of time a particular battery 410 is connected to the motor 420 can vary greatly depending on the application, battery characteristics, and/or user preferences, from a fraction of a second to several seconds to battery exhaustion.

Various circuitry can be designed to perform the functions of the parallel-sequenced configuration 300. FIGS. 8-12 illustrate an example design for the configuration 300. Other designs (not shown) may also be used to perform similar functionality. FIGS. 8-12 illustrate various inputs, outputs, and components (e.g., resistors, capacitors, diodes, Zener diodes, transistors, amplifiers, logic chips, and other ASICs) used in the configuration 300. A Zener diode allows current to flow in the forward direction in the same manner as an typical diode, but also permits current to flow in the reverse direction when the voltage is above a specified value known as the breakdown voltage, "Zener knee voltage", "Zener voltage", "avalanche point", or "peak inverse voltage," Transistors can include both p-channel (PNP) and n-channel (NPN) bipolar junction transistors (BJTs or bipolar transistors), FETs, and both p-channel (PNP) and re-channel (NPN) metal-oxide-semiconductor field-effect transistors (MOSFETs). The BJT is a type of transistor that relies on the contact of two types of semiconductor for its operation. The regions of a BJT are called emitter, collector, and base. MOSFETs are used for amplifying or switching electronic signals. The four terminals of the FET are named source, gate, drain, and body (substrate). Types of MOSFETs include enhancement mode MOSFETs (MOSFET enh) and depletion mode MOSFETs (MOSFET dep). In enhancement mode MOSFETs, a voltage drop across the oxide induces a conducting channel between the source and drain contacts via the field effect. The term "enhancement mode" refers to the increase of conductivity with increase in oxide field that adds carriers to the channel, also referred to as the inversion layer.

Figure 4:
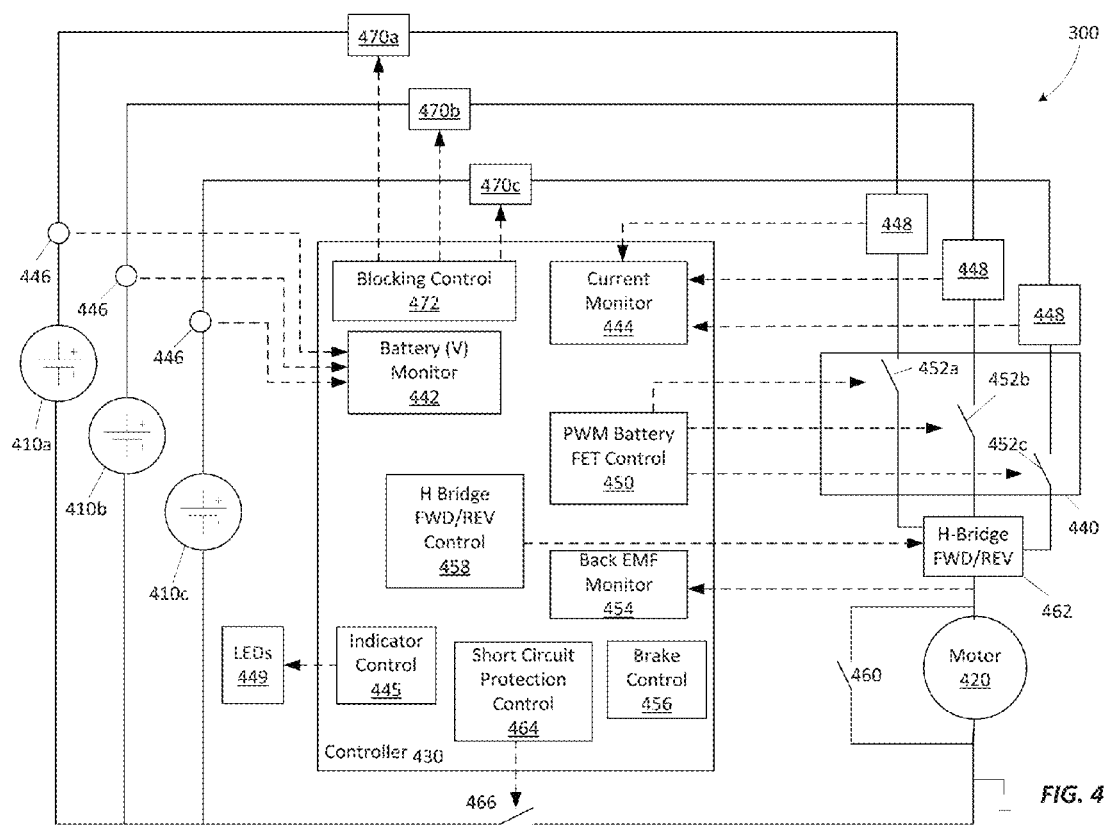
FIG. 4 illustrates another block diagram of the sequenced, parallel-connected multiple battery pack configuration according to the third embodiment of the invention.
Figure 8:
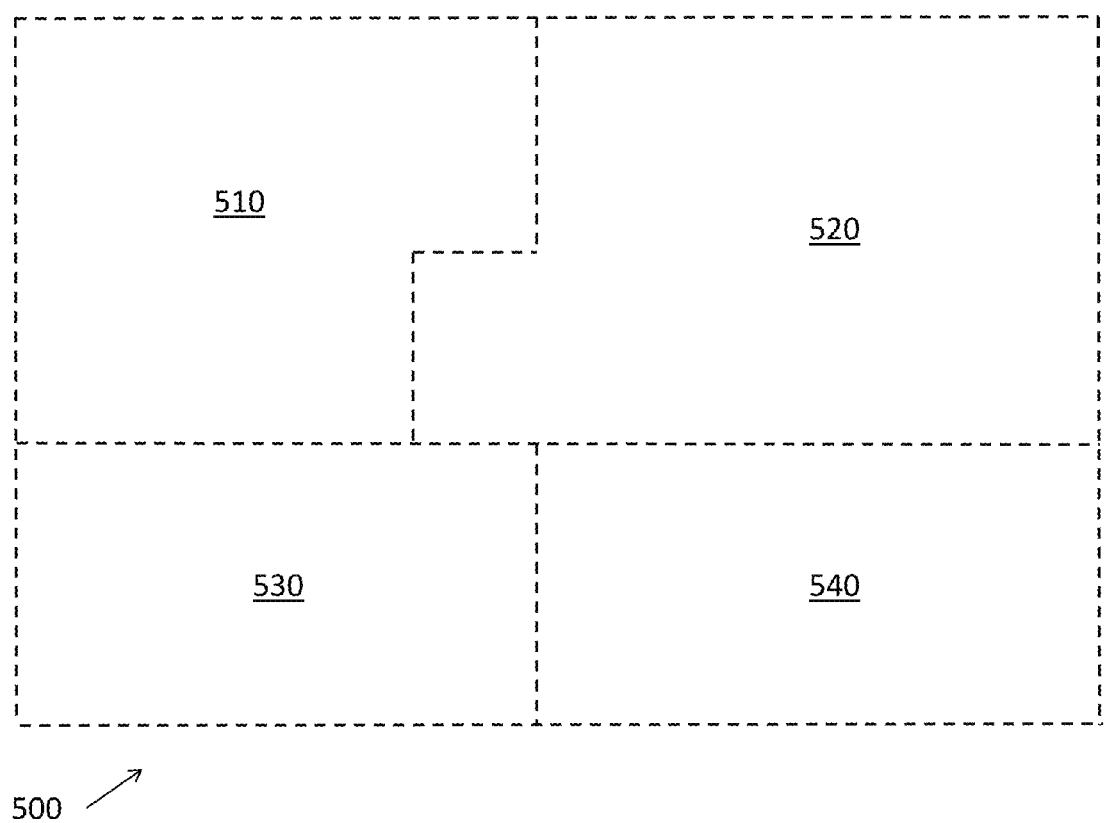
FIG. 8 illustrates a schematic diagram of the sequenced, parallel-connected multiple battery pack configuration according to the third embodiment of the invention.
Figure 9:
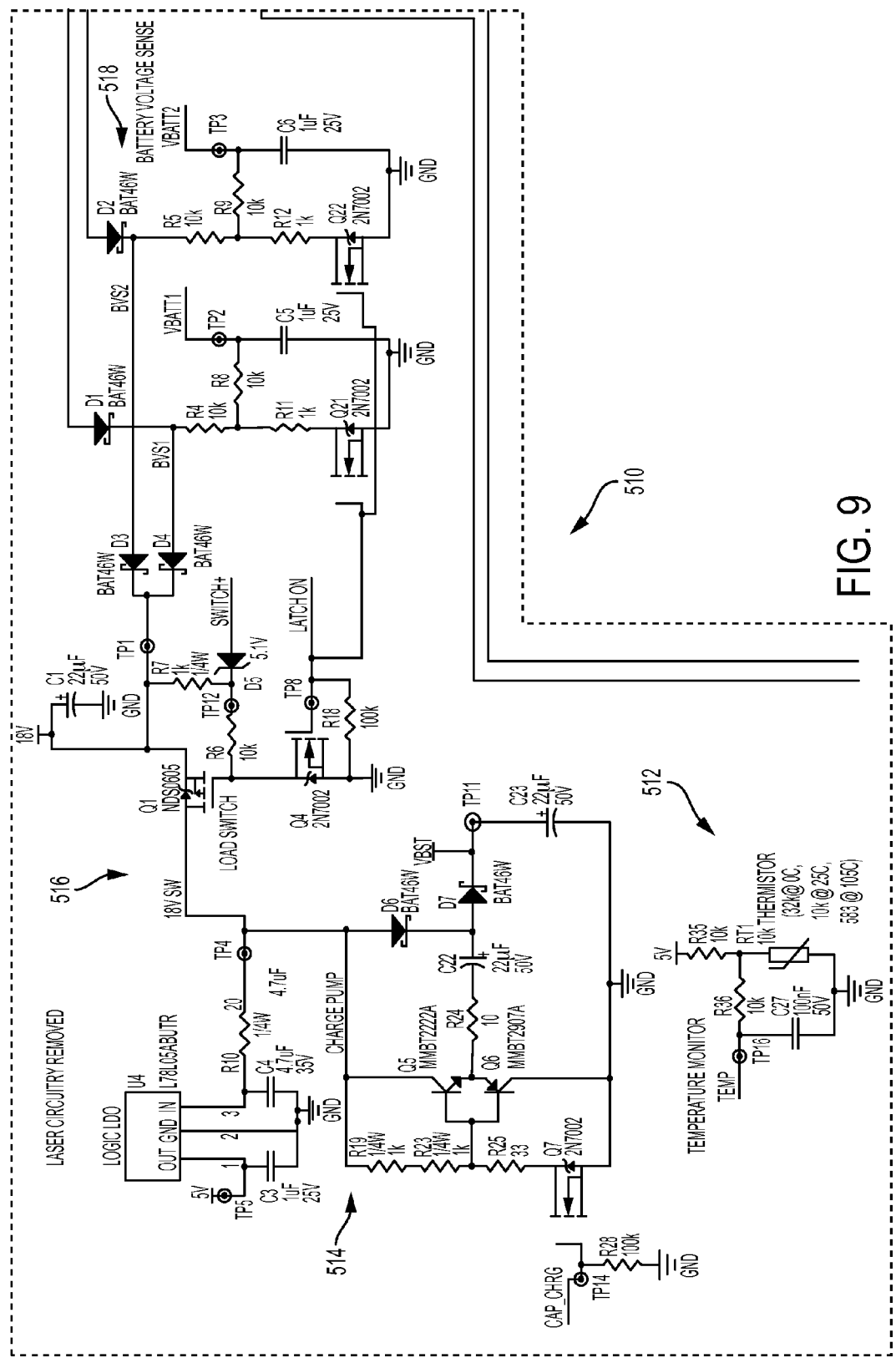
FIGS. 9-12 illustrate expanded schematic diagrams of the circuitry shown in FIG. 8.
Figure 10:
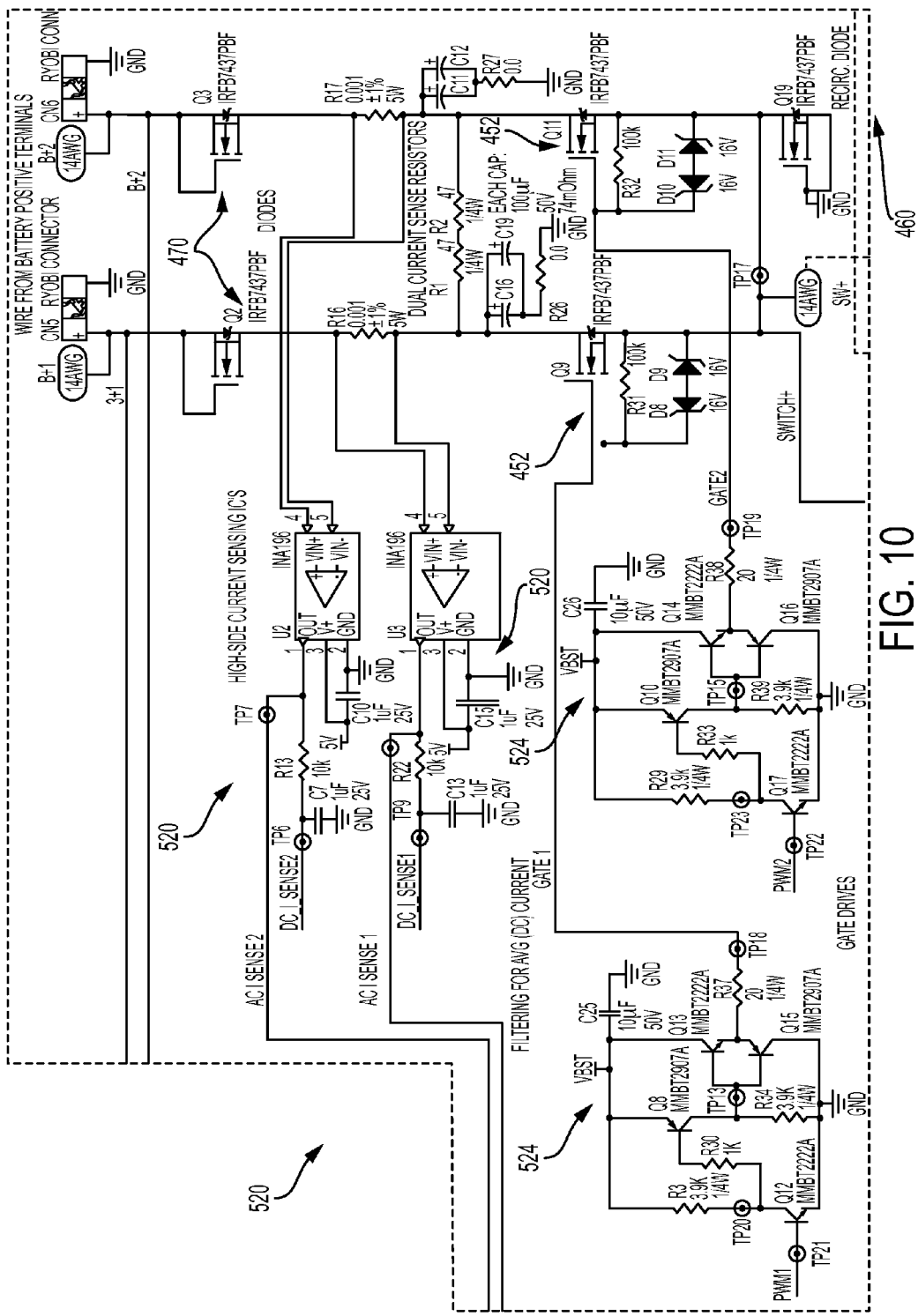
Figure 11:
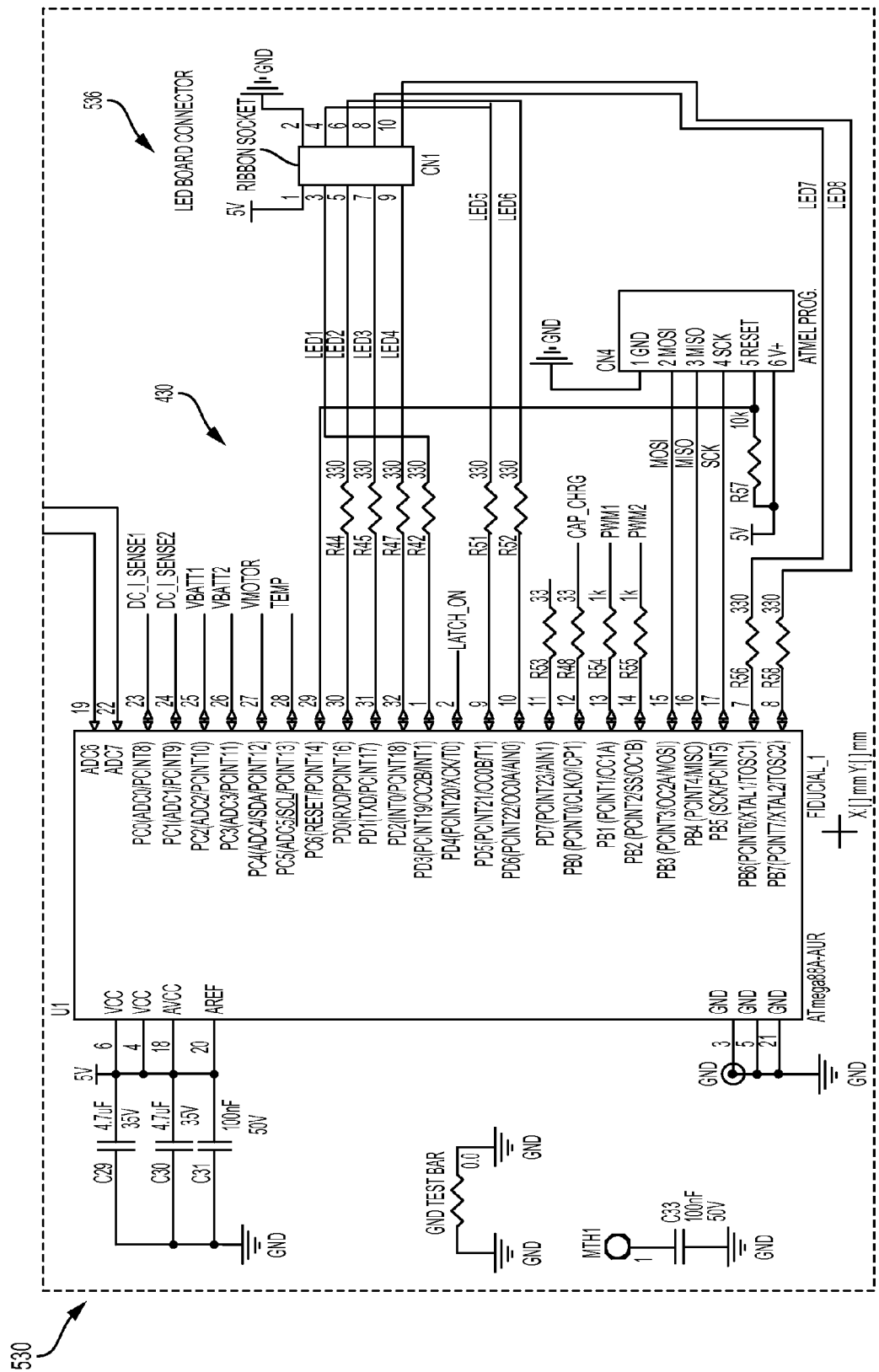
Figure 12:
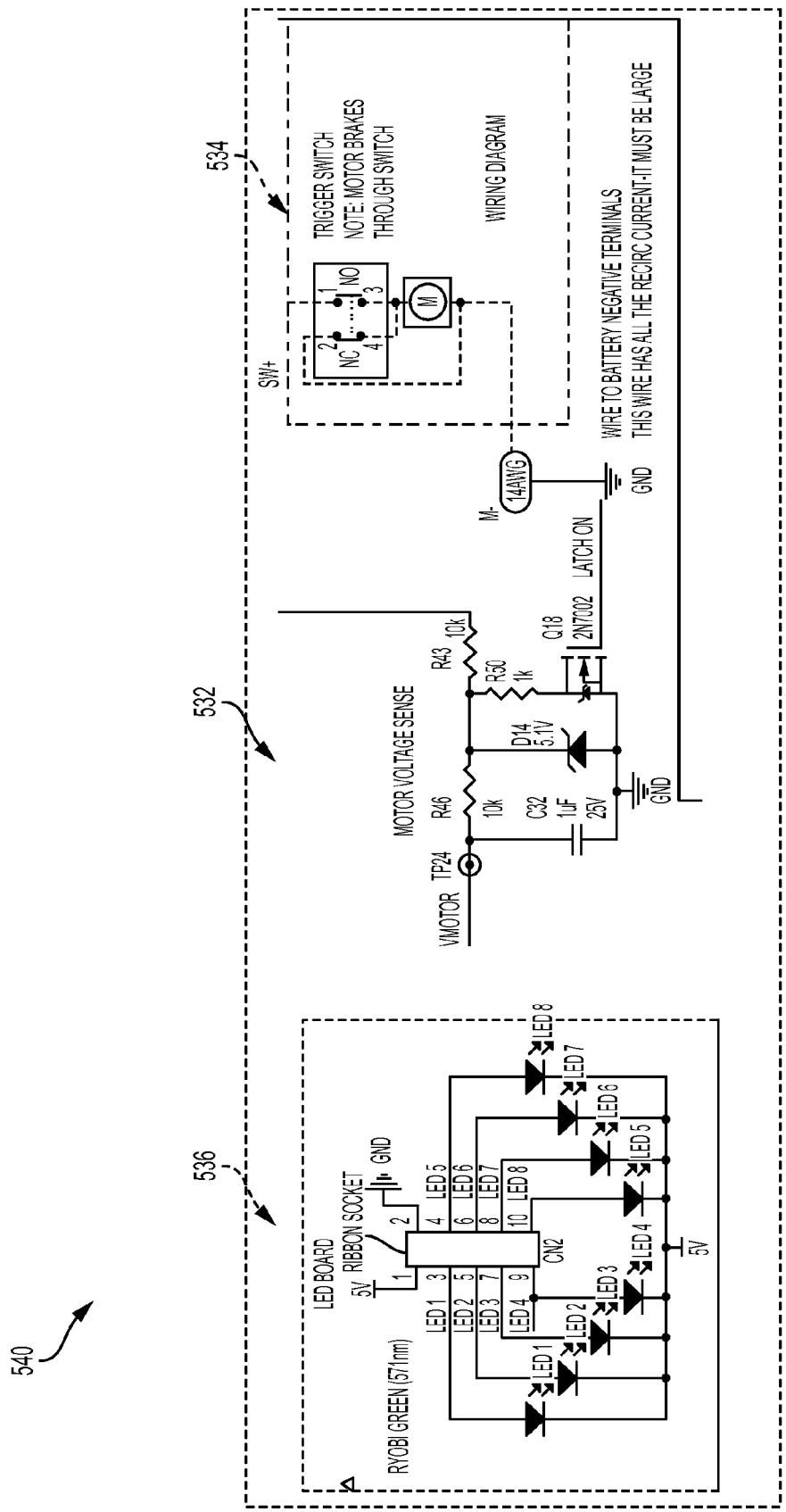

FIG. 8 illustrates a schematic PCBA 500 for a power tool implementing the block diagram of the configuration 300 of FIG. 4. The PCBA 500 can be considered an exemplary implementation of the PCBA 429 of FIG. 3. The PCBA 500 includes a wake up circuitry block 510, a battery selector circuitry block 520, a controller circuitry block 530, and a motor circuitry block 540. FIGS. 9-12 illustrate expanded schematic diagrams of circuitry shown in FIG. 8. FIG. 9 illustrates circuitry for the wake up block 510 and includes a temperature monitor 512, a charge pump 514, a load switch 516, and a battery voltage sense 518. FIG. 10 illustrates the battery selector block 520 which shows the circuitry for connecting the batteries 410 to the reverse current blocking elements 470, the switching elements 452, and the current sensors 448. In addition FIG. 10 illustrates circuitry for current sensor resistor amplifiers 520, post-amplification filters 522, battery gate drivers 524, and the recirculation switch (brake switch 460). FIG. 11 shows the controller block 530, which illustrates circuitry for the controller 430 and an LED board connector 530. FIG. 12 shows the motor circuitry block, which illustrates circuitry for a motor voltage sense 532, the brake switch 534, and an LED board 536.

The parallel-sequenced configuration 300 is configured for various controller operations, such as load sharing, soft start, speed control, single/weak battery operation, mechanical start/stop switch, and boost function. In load sharing, the controller 430 measures the DCIR and voltage of the batteries 410. From this DCIR and/or voltage information, the controller 430 can determine the condition of the batteries 410. The controller 430 is configured to draw more power from the stronger batteries 410. If a battery 410 is/becomes discharged, the controller 430 will not attempt to discharge from that battery 410.

In soft start, the controller 430 provides current limiting during startup. Speed control is accomplished by PWM control and feedback from the back EMF of the motor 420. Braking can be applied to stop the motor 420 if required for the application. Speed control provides consistent speed with varying battery voltages and motor loads. In single/weak battery 410 operation, if the controller 430 determines that only one charged battery 410 is installed, the controller 430 can operate the motor 420 at reduced performance. A mechanical start/stop switch (e.g., trigger) starts and stops the motor 420. Position feedback can be added to provide variable speed control of the motor 420. The mechanical start/stop switch can also be used to signal the controller to apply the brake 460. If the user closes the boost switch, then the duty cycle of the PWM is increased to increase the power to the motor 420.

Figure 13:
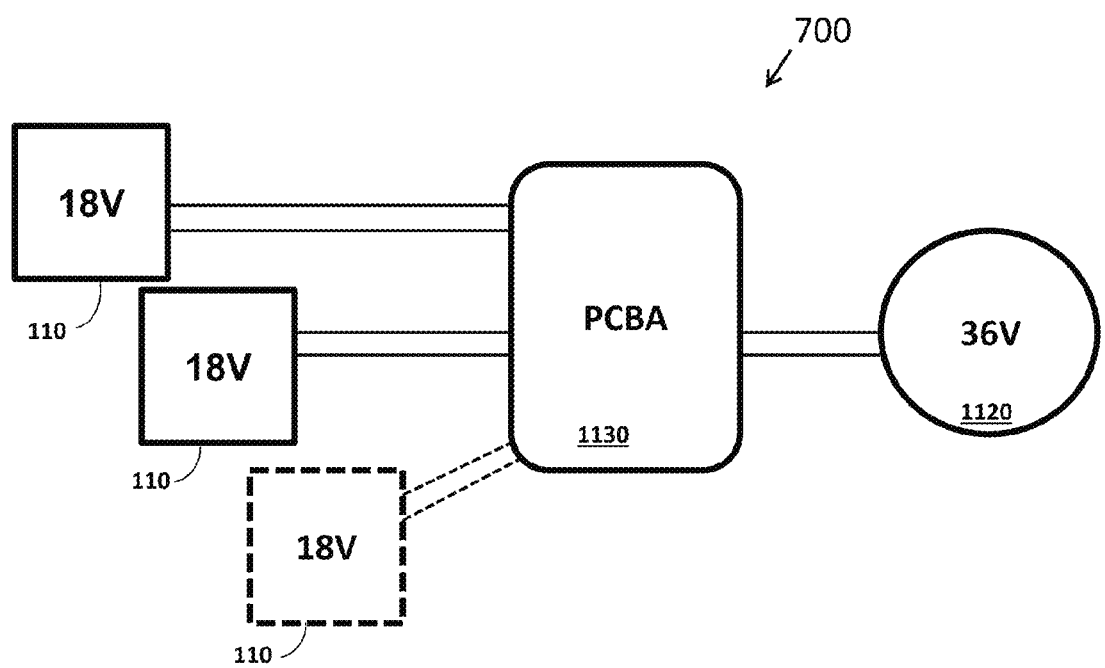
FIG. 13 illustrates a block diagram of a sequenced, multiple battery pack configuration according to a fourth embodiment of the invention.

FIG. 13 illustrates a block diagram of another multi-battery pack configuration, a sequenced, multiple battery pack configuration 700 (sequenced configuration 700). The sequenced configuration 700 includes multiple (N) battery packs 110 for a power tool that are individually and selectively coupled to a DC-to-DC converter, e.g., residing on a PCBA 1130. The DC-to-DC converter is, in turn, coupled to the 36V motor 1120. The DC-to-DC converter steps up the voltage output by a battery pack to a voltage level preferably used by the motor 1120 (e.g., from 18V to 36V, or another suitable voltage for the motor).

Similar to parallel configuration 200 and parallel-sequenced configuration 300, the configuration 700 enables a power tool to receive one, two, or more battery packs 110 simultaneously. Similar to configuration 300, full capacity can be delivered and exhausted by each battery pack 110 before discharging the next battery pack 110. In configuration 700, initial performance of the motor 1120 is not negatively impacted by weakest battery pack 110, in contrast to some series-connected configurations. Eventually, performance of the motor 1120 (or power tool) may be impacted as the stronger battery packs 110 are exhausted and the motor 1120 is powered by the remaining weaker battery packs (e.g., older battery packs). The power of the motor 1120 (or power tool) may be limited by the current provided by a single battery pack 110 (e.g., 55A). Due to weak battery packs 110 and/or DC to DC-conversion, the current drawn by the motor 1120 can be less than half of the total current available by a new, strong battery pack 110. The configuration 700 may include a 4 pole and/or 4 brush motor or a 2 pole and/or 2 brush motor. The PCBA 1130 can include the DC-to-DC converter to step up the voltage and the soft start mechanism and can be used to monitor battery pack health. In some instances, the DC-to-DC converter is provided separately from the PCBA 1130.

Figure 14:
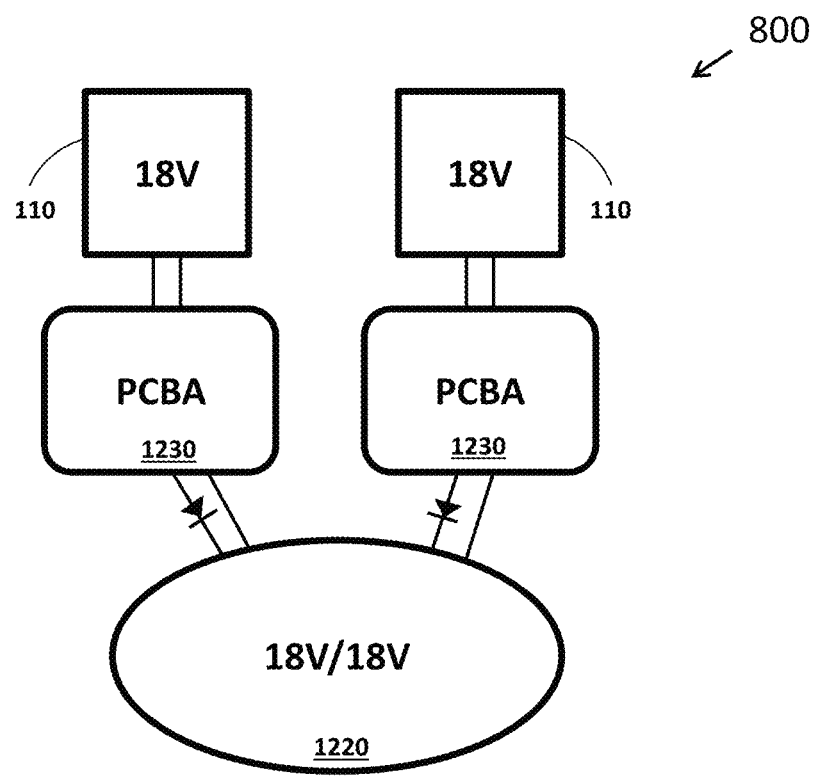
FIG. 14 illustrates a block diagram of a multiple battery pack and dual commutator motor configuration according to a fifth embodiment of the invention.

FIG. 14 illustrates a block diagram of another multi-battery pack configuration, a two-battery, dual commutator configuration 800 (dual commutator configuration 800). The dual commutator configuration 800 includes two independently connected battery packs 110, each associated with an independent commutator of a dual commutator motor 1220 of a power tool. A commutator is the moving part of a rotary electrical switch in certain types of electric motors or electrical generators that periodically reverses the current direction between the rotor and the external circuit. Typically, two or more softer metallic brushes periodically contact a commutator to complete a circuit between a battery 110 and rotor winding.

The dual commutator configuration 800 uses a dual winding motor (18V+18V configuration) where two commutators (one per winding) are coupled to a same motor shaft. Each battery pack 110 powers a separate motor commutator/winding. The motor (or power tool) can run on one or two packs, where each winding and battery pack 110 operates independently of the other winding and other battery pack 110. Each battery pack 110 can deliver full capacity of the battery pack 110. Performance of the motor 1120 generally differs when running one battery pack 110 versus two battery packs 110. Running two battery packs 110 generally results in greater power than running a single battery pack 110. Diodes may also be used prevent weak packs from being charged due to a voltage drop between battery packs 110 (e.g., cross-charging). A PCBA 1230 can include the soft start mechanism and control circuitry for the motor 1220.

Figure 15:
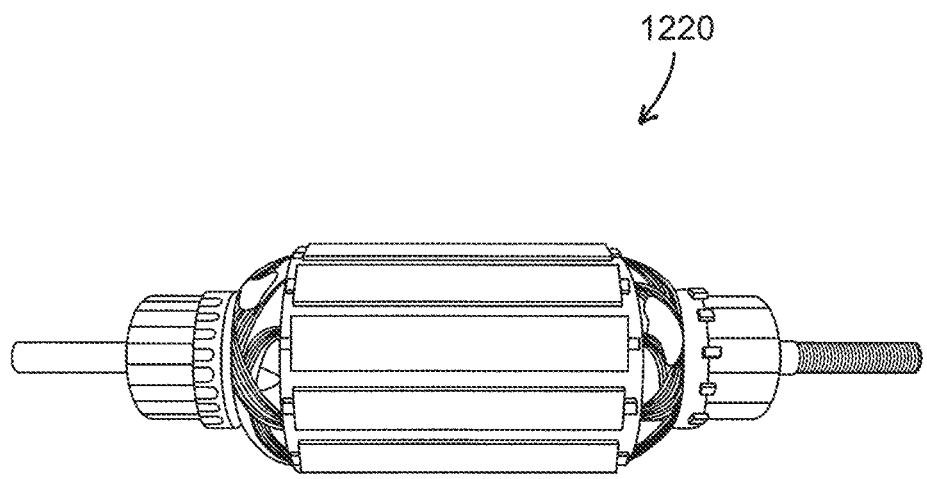
FIG. 15 illustrates a dual commutator motor according to the fifth embodiment of the invention.
Figure 16:
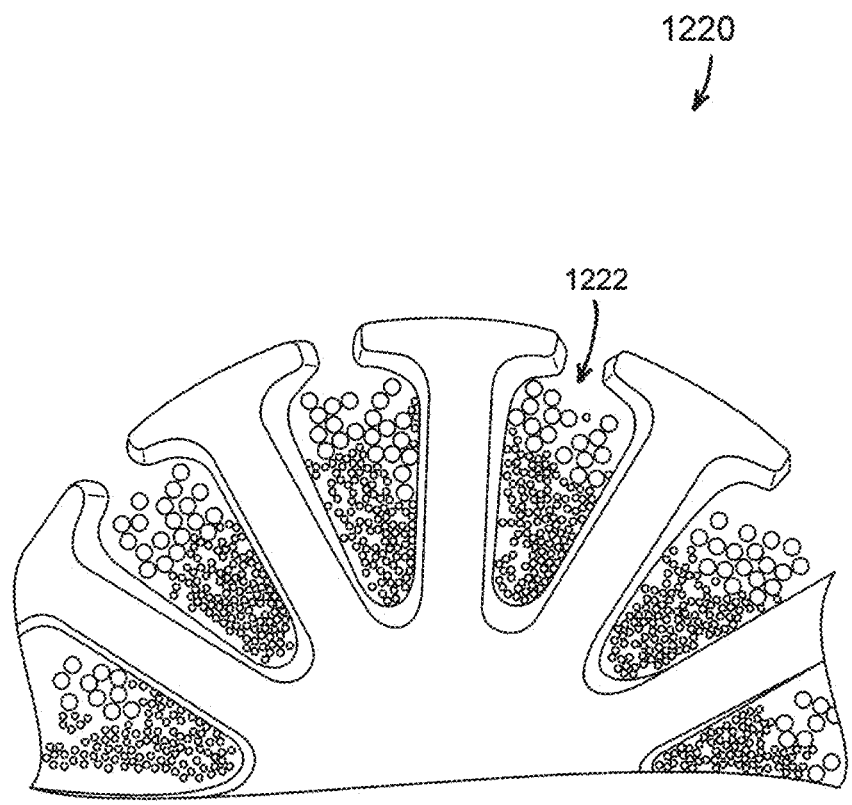
FIG. 16 illustrates a cross-sectional view of dual armature windings for a motor according to the fifth embodiment of the invention.

FIG. 15 provides one example of a dual DC commutator motor 1220 for a power tool. In the dual DC commutator motor 1220, both windings occupy the same armature slots 1222. In some instances, the wire gauge used for each winding is different and the number of turns for each winding is also different. See, e.g., FIG. 16. For instance, the different wire gauge may be used to align with different power levels provided to the respective windings (generally, the higher gauge wire is designed with higher current). In other embodiments, such as a power tool with two 18V battery packs 110 and circuitry designed to provide similar power levels to each winding, respectively, the wire gauges for both windings are the same. Alternatively, each winding may be in a separate armature slots of the stator, so each winding alternates armature slots.

Figure 17A:
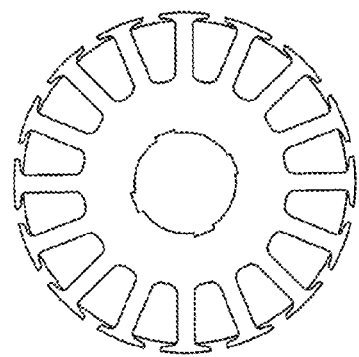
FIGS. 17A-D illustrate stator stacks for a motor according to the fifth embodiment of the invention.
Figure 17C:
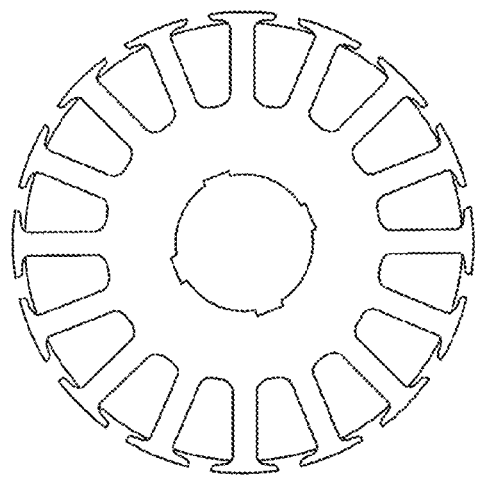
Figure 17B:
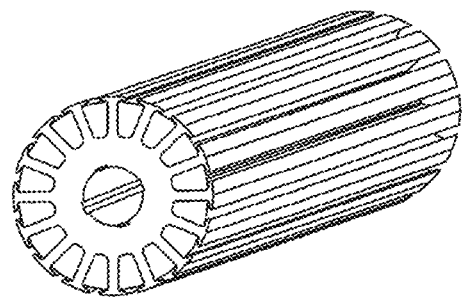

The speed of the motor 1220 is inversely proportional to the number of turns in the armature. So, the speed increases with fewer turns in the armature. The torque of the motor 1120 is directly proportional to the number of turns in the armature. So, the torque of the motor 1120 is lowered with a decrease in the number of turns in the armature. With fewer windings for each commutator of a dual commutator motor, each commutator has fewer acting conductors contributing to the overall torque of the motor. Since speed and torque are also inversely proportional to the motor's flux, the motor's speed can be lowered and the torque can be increased by increasing the stack length of the motor 1120. Increasing the stack length of the motor 1120 can have manufacturing challenges, such the difficulty of winding wire without bowing out of the core. Typically, windings do not lay as well in the slots for long stacks of the armature. FIGS. 17A-B illustrate a long stack, narrow diameter armature that can be used in a dual DC commutator motor.

Figure 17D:
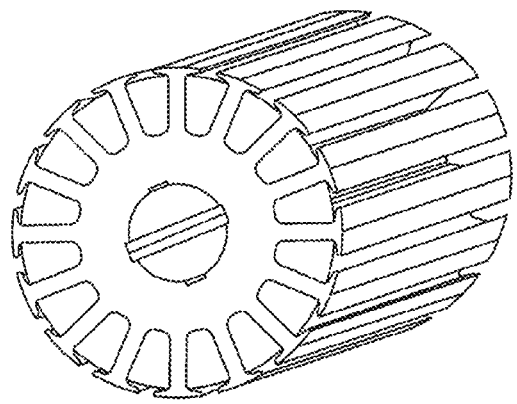

Various techniques can be used to mitigate the manufacturing challenges associated with long armature stacks. The size of the lamination being used in the armature can be increased to reduce manufacturing challenges associated with long stack armatures. Increasing the size of the lamination allows a specified number of turns to be wound on the armature with a wire size that provides the desired torque and current rating. FIGS. 17C-D illustrate a short stack, large diameter armature with larger outside diameter (O.D.) construction at a shorter length than a small and long armature construction. The larger lamination construction can also allow windings (i.e., wire) with double insulation better than the small and long armature construction.

Figure 18:
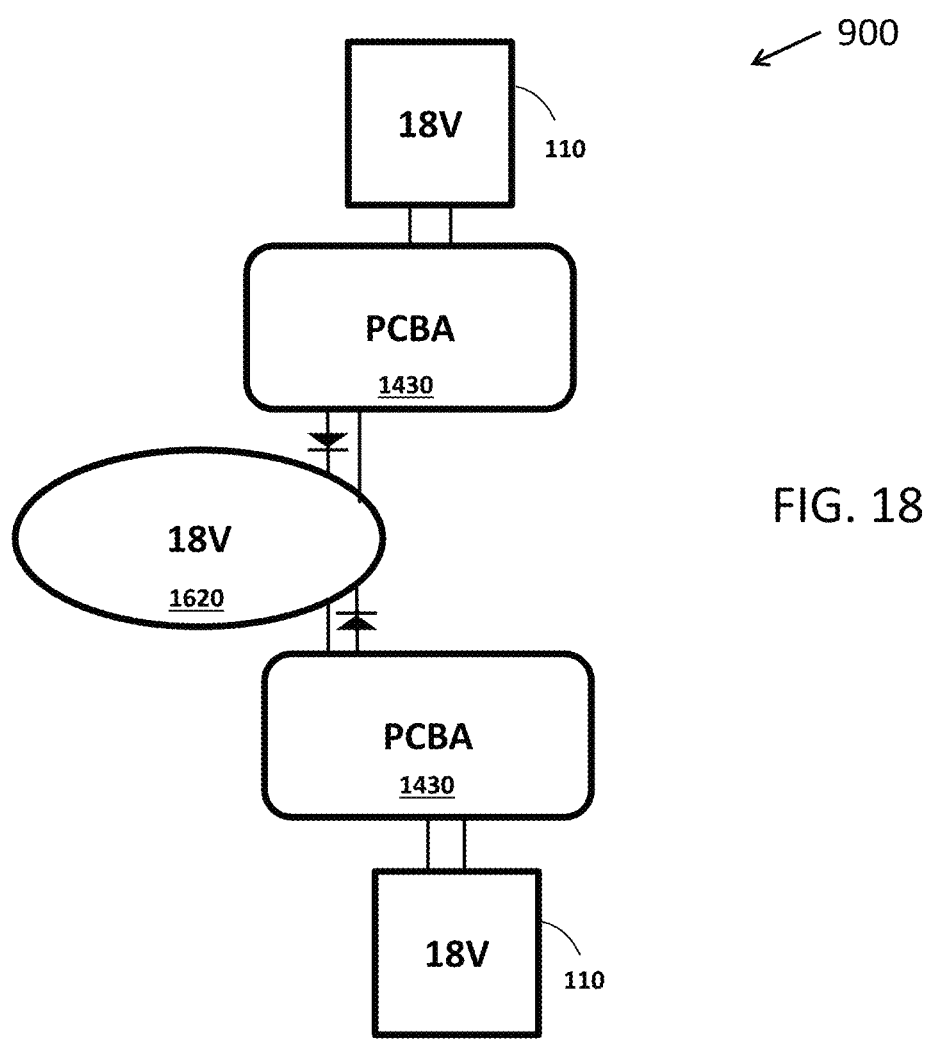
FIG. 18 illustrates a block diagram of a multiple battery pack and separate brush configuration according to a sixth embodiment of the invention.

FIG. 18 illustrates a block diagram of another multi-battery pack configuration, a multiple battery pack and separate brush configuration 900 (separate brush configuration 900). The separate brush configuration 900 includes multiple battery packs 110 where each battery pack 110 is connected to separate brushes of a motor 1620 of a power tool. In the configuration 900, similar to the configuration 800, two separate windings are wound on a same stator of the motor 1620 (see FIG. 18). Each battery pack 110 is coupled to a separate winding operating at about 18V. Each armature slot of the stator may include both windings. Alternatively, each winding may be in a separate armature slots of the stator, so each winding alternates armature slots.

In the configuration 900, each battery 110 powers a separate pair of brushes on the same commutator, so the motor 1620 is configured with four brushes. As previously described, four brushes can lower current density of the brushes. The motor 1620 (or power tool) can run on one or two battery packs 110 because each battery pack 110 and winding operates as a separate circuit. Similar to configuration 800, each battery pack 110 can deliver at its full capacity. Also similar to configuration 800, performance of the motor 1620 generally differs when running one battery pack 110 versus two battery packs 110. Running two battery packs 110 generally results in greater motor power than running a single battery pack 110. Also similar to configuration 800, diodes may be used to prevent weak battery packs 110 from being charged due to a voltage drop between battery packs 110 (e.g., cross-charging). A PCBA 1430 can include the soft start mechanism and circuitry for controlling the motor 1620.

Thus, the invention provides, among other things, a power tool operable to receive at least a first battery pack and a second battery pack. Various features and advantages of the invention are set forth in the following claims.

The invention claimed is:

1. A power tool comprising:
 a motor;
 a first battery pack;
 a second battery pack;
 a first switching element coupled between the first battery pack and the motor;
 a second switching element coupled between the second battery pack and the motor; and
 a controller coupled to the first switching element and the second switching element, the controller having
  a first pulse-width modulation (PWM) output coupled to the first switching element and outputting a first PWM signal to selectively close the first switching element, and
  a second PWM output coupled to the second switching element and outputting a second PWM signal to selectively close the second switching element,
  wherein a first duty cycle of the first PWM signal and a second duty cycle of the second PWM signal are determined by the controller based on a state of charge of the second battery pack relative to a state of charge of the first battery pack.

2. The power tool of claim 1, wherein the first duty cycle of the first PWM signal is greater than the second duty cycle of the second PWM signal when the state of charge of the first battery pack is greater than the state of charge of the second battery pack.

3. The power tool of claim 1, wherein an on period of the first PWM signal overlaps with an on period of the second PWM signal such that, when the on periods of the first and second PWM signal overlap, the first and second switching element are both closed.

4. The power tool of claim 1, further comprising a first reverse current blocking element coupled in series between the first battery pack and the first switching element, and a second reverse current blocking element coupled between the second battery pack and the second switching element.

5. The power tool of claim 4, wherein the first reverse current blocking element is at least one selected from the group of (i) a diode and (ii) a FET having a first drain and first gate coupled to the first battery pack, and wherein the second reverse current blocking element is at least one selected from the group of (i) a diode and (ii) a FET having a first drain and first gate coupled to the second battery pack.

6. The power tool of claim 4, further comprising a first current sensor coupled in series between the first switching element and the first reverse current blocking element and a second current sensor coupled between the second switching element and the second reverse current blocking element.

7. The power tool of claim 6, wherein the controller includes a first reverse current blocking control output coupled to the first reverse current blocking element and a second reverse current blocking control output coupled to the second reverse current blocking element, and the controller selectively controls the first and second reverse current blocking elements to open and close.

8. The power tool of claim 4, wherein the controller, for each PWM cycle over a period of PWM cycles, controls the first reverse current blocking element to close after the first switching element is closed, and controls the first reverse current blocking element to open before the first switching element opens.

9. A method of operating a power tool having a motor, a first battery pack, a second battery pack, a first switching element coupled between the first battery pack and the motor, a second switching element coupled between the second battery pack and the motor; and a controller, the method comprising:
 determining, by the controller, a state of charge of the first battery pack;
 determining, by the controller, a state of charge of the second battery pack;
 generating, by the controller, a first pulse-width modulation (PWM) signal to selectively close the first switching element to present power from the first battery pack to the motor, the first PWM signal based on the state of charge of the first battery pack;
 generating, by the controller, a second PWM signal to selectively close the second switching element to present power from the second battery pack to the motor, the second PWM signal based on the state of charge of the second battery pack; and
 driving the motor by the first battery pack and the second battery pack asynchronously, wherein a first duty cycle of the first PWM signal and a second duty cycle of the second PWM signal are determined by the controller based on the state of charge of the second battery pack relative to the state of charge of the first battery pack.

10. The method of claim 9, wherein the state of charge for the first PWM signal is determined by a voltage and an internal resistance of the first battery pack.

11. The method of claim 9, wherein the first duty cycle of the first PWM signal is greater than the second duty cycle of the second PWM signal when the state of charge of the first battery pack is greater than the state of charge of the second battery pack.

12. The method of claim 9, wherein an on period of the first PWM signal overlaps with an on period of the second PWM signal such that, when the on periods of the first and second PWM signals overlap, the first and second switching element are both closed.

13. The method of claim 12, wherein the first battery pack and the second battery pack have different states of charge.

14. The method of claim 9, wherein an on period of the first PWM signal and an on period of the second PWM signal are cyclical, such that the first PWM signal repeatedly opens and closes the first switching element, and the second switching element is closed when the first switching element is open and the second switching element is open when the first switching element is closed.

15. The method of claim 9, further comprising blocking current flowing from the first switching element to the first battery pack when the second switching element is closed using a first reverse current blocking element, and blocking current flowing from the second switching element to the second battery pack when the first switching element is closed using a second reverse current blocking element.

16. The method of claim 15, further comprising generating a third PWM signal that controls the first reverse current blocking element and generating a fourth PWM signal that controls the second reverse current blocking element.

17. The method of claim 9, further comprising sensing a current generated by the first battery pack using a first current sensor and sensing a current generated by the second battery pack using a second current sensor.

18. A power tool comprising:
 a motor;
 a first battery pack;
 a second battery pack;
 a first switching element coupled between the first battery pack and the motor;
 a second switching element coupled between the second battery pack and the motor;
 a first reverse current blocking element coupled in series between the first battery pack and the first switching element;
 a second reverse current blocking element coupled between the second battery pack and the second switching element;
 a first current sensor coupled in series between the first switching element and the first reverse current blocking element;
 a second current sensor coupled between the second switching element and the second reverse current blocking element; and
 a controller coupled to the first switching element and the second switching element, the controller having
  a first pulse-width modulation (PWM) output coupled to the first switching element and outputting a first PWM signal to selectively close the first switching element, and
  a second PWM output coupled to the second switching element and outputting a second PWM signal to selectively close the second switching element.

19. The power tool of claim 18, wherein the controller includes a first reverse current blocking control output coupled to the first reverse current blocking element and a second reverse current blocking control output coupled to the second reverse current blocking element, and the controller selectively controls the first and second reverse current blocking elements to open and close.

20. A power tool comprising:
 a motor;
 a first battery pack;
 a second battery pack;
 a first switching element coupled between the first battery pack and the motor;
 a second switching element coupled between the second battery pack and the motor;
 a first reverse current blocking element coupled in series between the first battery pack and the first switching element;
 a second reverse current blocking element coupled between the second battery pack and the second switching element; and
 a controller coupled to the first switching element and the second switching element, the controller having
  a first pulse-width modulation (PWM) output coupled to the first switching element and outputting a first PWM signal to selectively close the first switching element, and a second PWM output coupled to the second switching element and outputting a second PWM signal to selectively close the second switching element, wherein the controller, for each PWM cycle over a period of PWM cycles, controls the first reverse current blocking element to close after the first switching element is closed, and controls the first reverse current blocking element to open before the first switching element opens.

21. A method of operating a power tool having a motor, a first battery pack, a second battery pack, a first switching element coupled between the first battery pack and the motor, a second switching element coupled between the second battery pack and the motor; and a controller, the method comprising:

determining, by the controller, a state of charge of the first battery pack;

determining, by the controller, a state of charge of the second battery pack;

generating, by the controller, a first pulse-width modulation (PWM) signal to selectively close the first switching element to present power from the first battery pack to the motor, the first PWM signal based on the state of charge of the first battery pack;

generating, by the controller, a second PWM signal to selectively close the second switching element to present power from the second battery pack to the motor, the second PWM signal based on the state of charge of the second battery pack;

driving the motor by the first battery pack and the second battery pack asynchronously;

blocking current flowing from the first switching element to the first battery pack when the second switching element is closed using a first reverse current blocking element;

blocking current flowing from the second switching element to the second battery pack when the first switching element is closed using a second reverse current blocking element;

generating a third PWM signal that controls the first reverse current blocking element; and generating a fourth PWM signal that controls the second reverse current blocking element.

* * * * *